W. L. SNIDER.
FILM MOUNT.
APPLICATION FILED MAR. 15, 1918.
1,285,441. Patented Nov. 19, 1918.
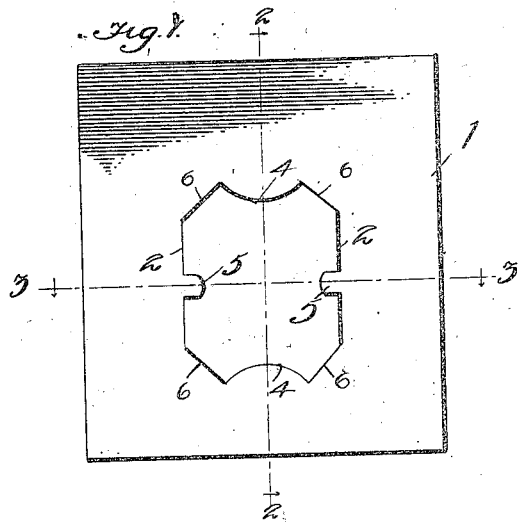
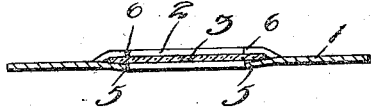
WITNESSES
INVENTOR
WARREN L. SNIDER
ATTORNEYS

UNITED STATES PATENT OFFICE.

WARREN L. SNIDER, OF HOT SPRINGS, ARKANSAS.

FILM-MOUNT.

1,285,441.  Specification of Letters Patent.  Patented Nov. 19, 1918.

Application filed March 15, 1918. Serial No. 222,713.

*To all whom it may concern:*

Be it known that I, WARREN L. SNIDER, a citizen of the United States, and a resident of Hot Springs, in the county of Garland and State of Arkansas, have invented certain new and useful Improvements in Film-Mounts, of which the following is a specification.

My invention is an improvement in mounts for films, and has for its object to provide mechanism of the character specified especially adapted for mounting X-ray dental films in such manner that they may be easily viewed by transmitted light.

In the drawings:

Figure 1 is a front view of a film and its mounting;

Figs. 2 and 3 are sections on the lines 2—2 and 3—3, respectively, of Fig. 1, each view looking in the direction of the arrows adjacent the line.

In the present embodiment of the invention, the mount 1 is a suitable piece of cardboard, having at approximately the center thereof an opening or cut out 2. The film 3 is mounted in this opening or cut out, and it will be noticed that the opening is so cut that there are projecting portions 4 and 5 which project into the opening or cut out for engaging the film to hold the same from displacement.

The portions 4 are at the top and bottom of the opening 2, and they are curved extensions which engage over the front face of the film at the upper and lower ends thereof. The extensions 5 are in the form of rounded lugs, which engage the side edges of the film, and the opening has beveled corners 6 behind which the corners of the film may extend to hold the same in place.

I claim:

1. A mount for films of the character specified, comprising a sheet of cardboard having an approximately central opening, said opening having beveled corners and having rounded inward extensions intermediate the ends of its ends and intermediate the ends of its sides for engaging over the film.

2. A mount for films of the character specified, comprising a sheet of cardboard having an approximately central opening, said opening having rounded inward extensions intermediate the ends of its ends and intermediate the ends of its sides for engaging over the film.

WARREN L. SNIDER.

Witnesses:
 JEAN L. SNIDER,
 ARIANA T. ELLIS,